United States Patent
Murray

(10) Patent No.: US 9,157,537 B2
(45) Date of Patent: Oct. 13, 2015

(54) AIRCRAFT FLUID CHECK VALVE ASSEMBLY WITH INDEXING

(75) Inventor: Jonathan D. Murray, Greenbelt, MD (US)

(73) Assignee: Eaton Corporation, Cleveland, OH (US)

( * ) Notice: Subject to any disclaimer, the term of this patent is extended or adjusted under 35 U.S.C. 154(b) by 869 days.

(21) Appl. No.: 13/381,509

(22) PCT Filed: Jun. 30, 2010

(86) PCT No.: PCT/US2010/040603
§ 371 (c)(1),
(2), (4) Date: Feb. 3, 2012

(87) PCT Pub. No.: WO2011/002886
PCT Pub. Date: Jan. 6, 2011

(65) Prior Publication Data
US 2012/0125453 A1    May 24, 2012

Related U.S. Application Data

(60) Provisional application No. 61/221,951, filed on Jun. 30, 2009.

(51) Int. Cl.
| | | |
|---|---|---|
| F16K 15/03 | (2006.01) | |
| F16K 15/00 | (2006.01) | |
| F16K 17/00 | (2006.01) | |
| F16K 21/04 | (2006.01) | |
| F16K 25/00 | (2006.01) | |
| F16K 51/00 | (2006.01) | |

(52) U.S. Cl.
CPC ........... *F16K 15/038* (2013.01); *F16L 2201/10* (2013.01); *Y10T 137/7504* (2015.04); *Y10T 137/7837* (2015.04); *Y10T 137/7857* (2015.04)

(58) Field of Classification Search
CPC .............. F16K 15/038; F16K 27/0227; F16K 27/0218; F16K 27/0209; F16L 2201/10; F16L 23/00–23/24; Y10T 137/7857; Y10T 137/7504
USPC ......... 137/454.2, 515, 515.7, 515.5; 285/420, 285/421; 251/362
See application file for complete search history.

(56) References Cited

U.S. PATENT DOCUMENTS

| | | | | |
|---|---|---|---|---|
| 4,148,338 | A | * | 4/1979 | Skoli ........................... 137/515.7 |
| 4,279,403 | A | | 7/1981 | Hobson |
| 4,396,034 | A | | 8/1983 | Cherniak |
| 5,044,396 | A | | 9/1991 | Daudet et al. |
| 5,368,069 | A | * | 11/1994 | Felber ........................ 137/515.7 |

OTHER PUBLICATIONS

International Search Report, PCT/US2010/040603 dated, Feb. 18, 2011.

* cited by examiner

*Primary Examiner* — Craig Schneider
*Assistant Examiner* — Josephine Trinidad-Borges
(74) *Attorney, Agent, or Firm* — Fishman Stewart Yamaguchi PLLC

(57) ABSTRACT

An aircraft check valve assembly where the fluid check valve is indexed in rotational position relative to a first duct flange and to a second opposed duct flange and to a clamping band where the check valve includes an annular check valve flange having at least one index tab extending therefrom. The index tab formed in the check valve annular flange engages a void area formed in an outer annular ridge formed in the first and second duct flanges. A clamping band holds the first duct flange to the check valve flange and to the second duct flange where the clamping band is rotationally indexed to the check valve by index fingers formed on the index tab which and extends to occupy a gap formed in a hinge point of the band clamp.

12 Claims, 6 Drawing Sheets

AIRCRAFT FLUID CHECK VALVE ASSEMBLY WITH INDEXING

CROSS-REFERENCE TO RELATED APPLICATIONS

This application is a National Stage application which claims the benefit of International Application No. PCT/US2010/040603, filed Jun. 30, 2010, which claims priority based on U.S. Application No. 61/221,951, filed Jun. 30, 2009, all of which are hereby incorporated by reference in their entireties.

TECHNICAL FIELD

This application relates to aircraft fluid check valves and more specifically to aircraft fluid check valves in an aircraft fluid handling system that are joined to fluid duct flanges using a clamp band where the fluid duct flanges and/or the clamp band are indexed relative to the fluid check valve. The clamp band is indexed to the check valve using index fingers extending from the check valve. This check valve assembly provides both indexing and error proofing.

BACKGROUND

Fluid check valves are known and are commonly used in various types of aircraft fluid control systems such as for the engine bleed air system which supplies pressurized airflow to the cabin and auxiliary systems. The check valves allow the fluid being transported within the piping or ducting system to flow in one direction by opening the check valve. When the fluid starts to reverse flow direction, the check valve closes and thereby prevents the flow from reversing. This feature is especially important in aircraft applications where bleed air from the jet engine compressor is used to supply airflow to the aircraft auxiliary systems should an engine compressor stall occur. Immediately upon the onset of compressor stall, the check valve must close and prevent airflow in an opposite direction from the auxiliary system into the engine compressor. If this does not occur and air is allowed to backflow, re-start of the engine is compromised.

In certain applications, especially in aircraft applications, it is desirable to rotationally index the various system components such as the fluid ducts leading to and from the check valve. Still in some other applications and installations it is also desirable to index or "clock" the clamping band that is used to hold various parts joined to the check valve such as the fluid duct flanges. In some applications, it would also be desirable to prevent the use of a light duty clamping band when a heavy duty clamping band is required.

SUMMARY

A fluid check valve system which incorporates indexing systems for the duct flanges, the check valve and the band clamp is disclosed. The check valve is designed to include at least one index tab which extends from the outside diameter of an annular flange which is attached and extends from the check valve. This index tab engages a corresponding slot formed in an outer annular ridge in at least one of an inlet duct flange and/or an outlet duct flange. This feature indexes or clocks the duct flanges to the check valve. To index the clamping band, an index finger formed on the end of the index tab, extends and passes at least partially through a gap formed by the retention system on the clamping band. Multiple index tabs and index fingers can be used depending on the number of gaps on the band clamp which can be used to prevent the improper clamp design from being used in a given application. For example, if a light duty clamp has one hinge joint in addition to a fastener section, then it cannot be fitted to a check valve assembly that uses three index tabs and index fingers. That configuration would require the use of a heavy duty band clamp that has two hinge joints in addition to the fastener section.

The indexing feature of the exemplary check valve assembly is useful as a method of ensuring that the inlet duct, the outlet duct and in some cases the clamping band are all properly aligned one to another to ensure proper assembly and operation. Note that in some applications, it is only necessary to index one of the fluid ducts to the check valve.

In addition, using the disclosed check valve assembly, proper assembly can be confirmed by visually inspecting the area of the clamping band and confirming the proper orientation of the index finger relative to the check valve flange and how the clamping band fits onto the check valve assembly.

The inlet (upstream) flange is shaped differently that the outlet (downstream) flange. This feature prevents the check valve from being inadvertently assembled improperly. An additional novel feature of the disclosed check valve assembly is that if the check valve is installed in a reversed orientation, it will not engage the duct flanges properly and a larger gap will appear between the duct flange and the check valve flange that will alert the technician of improper assembly when he/she tries to fit the band clamp. The increased width of the check valve assembly will prevent the band clamp from fitting properly. Using prior check valve systems, this undesirable result was not ready detectable due to the lack of a method to prevent the check valve from being installed backwards. In that case, the valve would open when the fluid was flowing in a direction opposite to that desired. The check valve would then have to be removed and re-installed in the proper orientation. Note that only one of the duct flanges need to be indexed even though the following detailed description discusses indexing both of the duct flanges.

DETAILED DESCRIPTION

Figure 1:
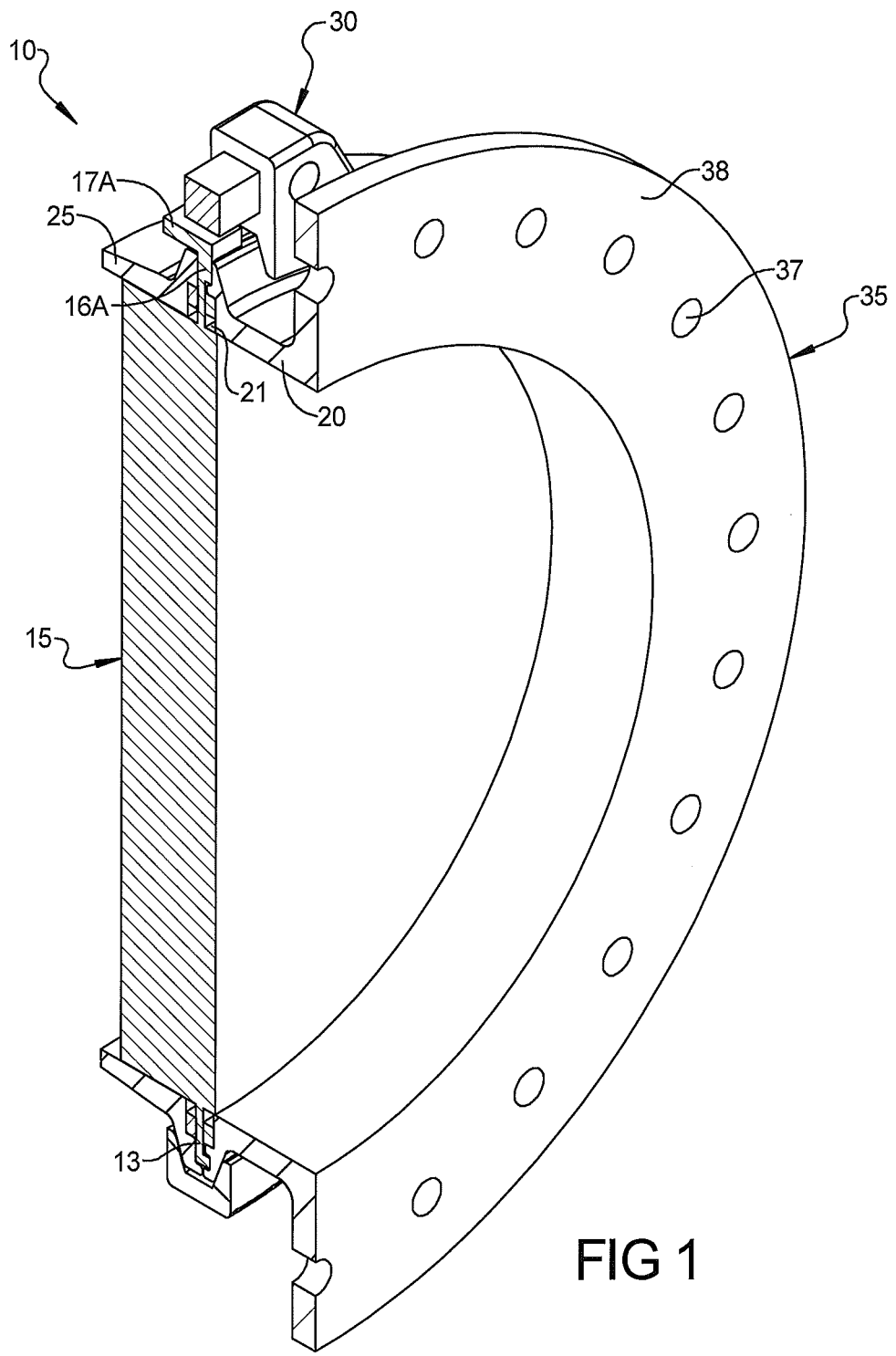
FIG. 1 is a sectional perspective view of the exemplary check valve with indexing.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Figure 3:
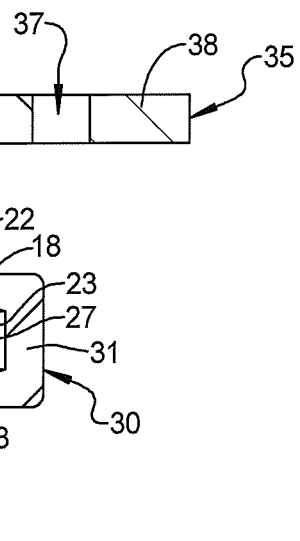
FIG. 3 is a cross-section view of the exemplary check valve and a cross-section of both the inlet and outlet duct flanges.

Now referring to FIG. 1 of the drawings, a cross-section perspective view of the exemplary check valve assembly 10 having indexing of the various components including a check valve 15 and a first duct flange 20 and a second duct flange 25 is shown. The check valve assembly 10 has at least one primary index tab 16A which is used to index or "clock" the check valve 15 to a first duct flange 20 (inlet duct) and to a second duct flange 25 (outlet duct). In this embodiment, two additional index tabs 16B and 16C (see FIG. 6) are also used for indexing the check valve 15 to the first and second duct flanges 20, 25. The primary index tab 16A, in conjunction with the secondary index tabs 16B and 16C act to rotationally position the check valve 15 relative to both the first flange 20 and a second duct flange 25. In this manner, the rotational positioning of the check valve properly positions the check valve assembly 10 and its associated fluid ducting to an aircraft fluid control system. Note that in some systems, it is only necessary to index (clock) only one of the duct flanges 20, 25 to the check valve 15 which will change the structure of the duct flanges 20 or 25 to eliminate the outer annular ridge 23 (see FIG. 3) which normally has void areas or slots to only accommodate the index tabs 16A-C in a specific rotation orientation between the duct flange 20, 25 and the check valve flange 13.

The check valve 15 includes check valve flange 13 which includes at least one index tab shown as index tabs 16A, 16B and 16C which are spaced at an angle of 120 degrees but could be spaced in any desired manner. The primary index tab 16A is wider than the secondary index tabs 16B and 16C (see FIG. 6) to index the rotational orientation of the check valve 15 to the first and second duct flanges 20, 25. When the check valve 15 is properly rotationally positioned to the first duct flange 20, the index tabs 16A, 16B and 16C occupy corresponding void areas 41A, 41B and 41C (see FIG. 7) formed in the first flange 20 which allows the check valve flange 13 to properly seat and fit onto the first flange 20. Note that the width of void area 41A is wider than either void area 41B or void area 41C to fit only with the index tab 16A. In a like manner, the check valve flange also seats and fits onto the second duct flange 25 when the index tabs 16A, 16B and 16C occupy similar void areas formed in the second duct flange 25.

The primary index tab 16A and the secondary index tabs 16B and 16C function to index the check valve 15 but can also include respective index fingers 17A, 17B and 17C (see FIG. 6) which function to not only rotationally index the band clamp 30 but also prevent the improper band clamp from being used in a given application. At the end of the primary index tab 16A a primary index finger 17A extends at a right angle and in a like manner, from the secondary index tabs 16B and 16C secondary index fingers 17B and 17C extend at a right angle from their respective index tabs 16B and 16C.

The first flange 20 can be joined at one end to an ordinary fluid duct section where flange 20 and the second duct flange 25 can be what is known in the industry as an S.A.E. AS1895 type flange. In fact, in aircraft applications, it is common to position the check valve (15) between what is known in the industry as AS1895 flanges. The check valve 15 can be any one of a number of prior art check valve designs or it could be the check valve design disclosed in co-pending International Application Ser. No. PCT/US10/40591 filed Jun. 30, 2010, the contents of which is incorporated herein in its entirety, if installation clearance is an issue.

Figure 2:
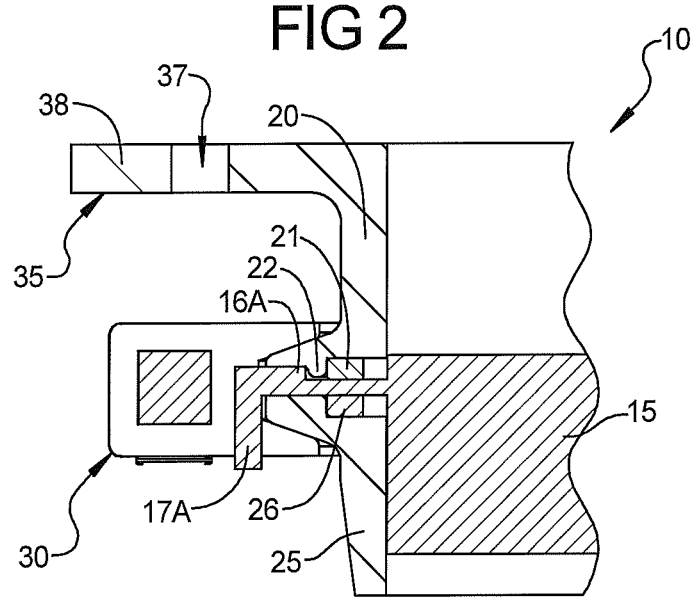
FIG. 2 is a cross-section view of the exemplary check valve having an indexing tab and an indexing index finger and sections of both the inlet and outlet duct flanges.

Now referring to FIG. 1 and FIG. 2 of the drawings, a portion of the check valve assembly 10 as shown in FIG. 1 is shown more clearly illustrating more clearly the primary index finger 17A. The check valve 15 includes a check valve flange 13 which, in this case, extends to form the primary index tab 16A and the primary index finger 17A. The first flange 20 is connected to the mounting flange portion 38 which includes apertures 37 for mounting and combine to form the mounting flange assembly 35. Seals 21 and 26 contact the first duct flange 20 and the second duct flange 25, respectively. On the opposite side of seals 21 and 26 contact is made with either side of the check valve flange 13 thereby providing a fluidic seal between the first flange 20 and the check valve flange 13 and in a like manner between the second duct flange and the check valve flange 13.

Holding the first flange 20 and the second duct flange 25 together is the band clamp 30 which can be what is known in the art as a "V-Band" clamp which sandwiches the first flange 20 and the second duct flange 25 together with the seals 21 and 26 and the check valve flange 13 all together when the band clamp 30 is tightened. An inner annular ridge 22 is formed on the first flange 20 and extends to hold the seal 21 in place relative to the first flange 20. An annular ridge 27 (see FIG. 3) extends from the second duct flange 25 and retains the seal 26 in position on the second duct flange 25. If both the first and second duct flanges 20, 25 need to be indexed to the check valve 15, then both duct flanges 20, and 25 need to include void areas 41A, 41B, 41C and 43A, 43B, 43C (see FIG. 7) in both the outer annular ridge 23 and in the annular ridge 27 respectively, to receive the index tab 16A. Now referring to FIG. 3 of the drawings a cross section of a portion of the check valve assembly of FIG. 1 is shown where the check valve is shown in a rotational position such that FIG. 3 does not show the primary or secondary index tabs 16A, 16B, 16C or primary or secondary index fingers 17A, 17B, 17C. Extending from the first flange 20 is an annular ridge 22 and an outer annular ridge 23 where the inner annular ridge 22 retains the seal 21 in position on the first flange 20. Because there is not a primary index tab 16A or secondary index tabs 16B, 16C in this particular orientation of the check valve assembly 10, there is an outer annular edge shown 23 and not one of the void areas 41A, 41B, 41C. In other words, the outer annular ridges 23 and 27 are present except where there are void areas 41A, 41B, 41C in outer annular ridge 23 and void areas 43A, 43B, 43C (as shown by the broken lines in FIG. 7) in annular ridge 27 for accommodating the primary or secondary index tabs 16A, 16B or 16C. In this manner, the first flange 20 and second duct flange 25 can be rotationally indexed to the check valve 15 since the primary and secondary index tabs 16A, 16B, 16C must be located within those void areas 41A, 41B, 41C and 43A, 43B, 43C (see FIG. 7) where the outer annular ridges 23 and 27 has been removed on not only the first flange 20, but in an identical manner on the second duct flange 25. If either one of the duct flanges 20, 25 do not have to be indexed, then the outer annular ridge 23 or the annular ridge 27 can be deleted. Clamp band 30 including clamp body 31 draws the first and second duct flanges 20, 25 together and retains the check valve assembly 10 together.

According to the present check valve assembly 10 with indexing, the first and second duct flanges 20, 25 are indexed in rotational position with respect to the check valve 15 through the use of index tabs including at least the primary index tab 16A and in this case, the secondary index tabs 16B and 16C which, when properly positioned, engage void areas created in the outer annular ridge 23 formed in the first flange 20 and in the annular ridge 27 formed in the second duct flange 25. Three index tabs and corresponding void areas are shown in the drawings but other numbers of tabs and matching void area shapes can be used and are contemplated within the scope of this disclosure. Check valve flange 13 extends from the check valve 15 and includes annular flange ridge 18.

Figure 4:
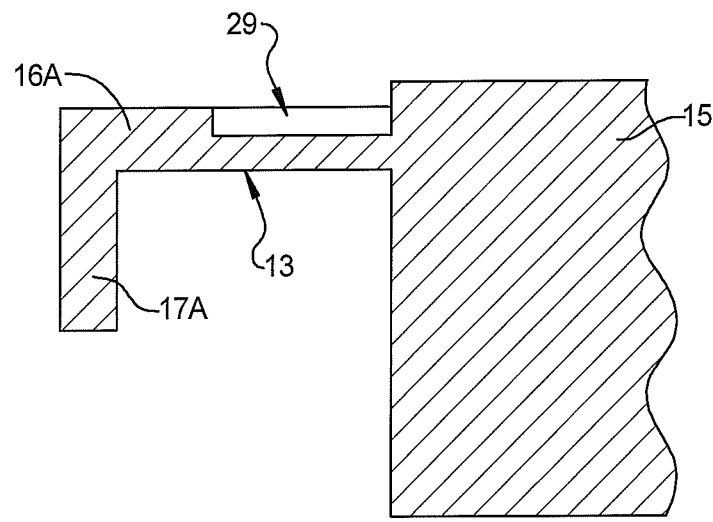
FIG. 4 is a cross-section view of the exemplary check valve and a cross-section of the check valve flange with an indexing tab and an indexing index finger.

Now referring to FIG. 4 of the drawings, a portion of the check valve 15 where the primary index finger 17A is formed on the primary index tab 16A to make up that portion of check valve flange 13. An annular segment cavity 29 is shown as formed in one side of the check valve flange 13 to provide for clearance for the seal 21 and the inner annular flange 22 that are used in conjunction with the first flange 20. The primary index tab 16A is shown as part of and extending from the check valve flange 13. Formed from the primary index tab is the primary index finger 17A. The primary index finger 17A is used to position the band clamp 30 on the assembly during assembly where the primary index finger 17A extends into one of the gaps 55A, 55B or 55C formed by either the hinge joints 50A or 50B or by the fastener 49 (see FIG. 8).

Figure 5:
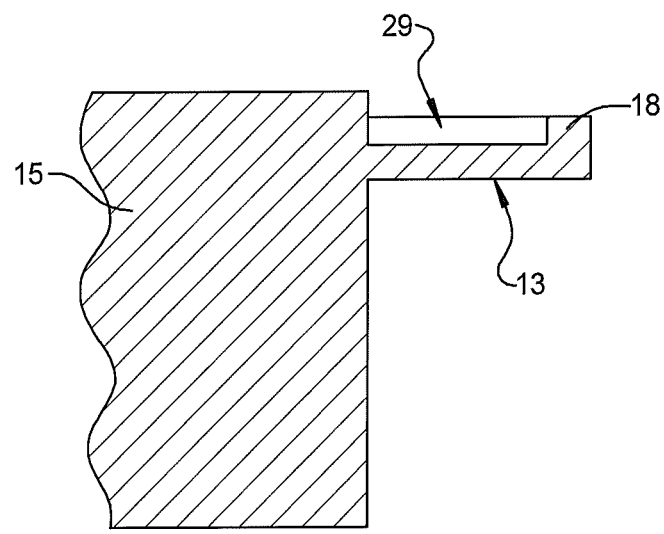
FIG. 5 is a cross-section view of the exemplary check valve and a cross-section of the check valve flange without an indexing tab or an indexing index finger.

Now referring to FIG. 5 of the drawings, a cross section of the check valve assembly 10 is shown which more clearly illustrates the section of the check valve flange 13 which is not in the area of any of the index tabs 16A, 16B or 16C. FIG. 5 shows a section of the check valve 15 and the attached check valve flange 13 that includes the annular segment cavity 29 where the check valve flange 13 includes at its extreme edge an annular flange ridge 18. Note that the annular segment cavity 29 continues around the surface of the check valve flange 13 and accommodates the seal 21 and the inner annular ridge 22. Note that in some applications it is only necessary to index (clock) either the first duct flange 20 or the second duct flange 25 to the check valve 15 but not both.

Figure 6:
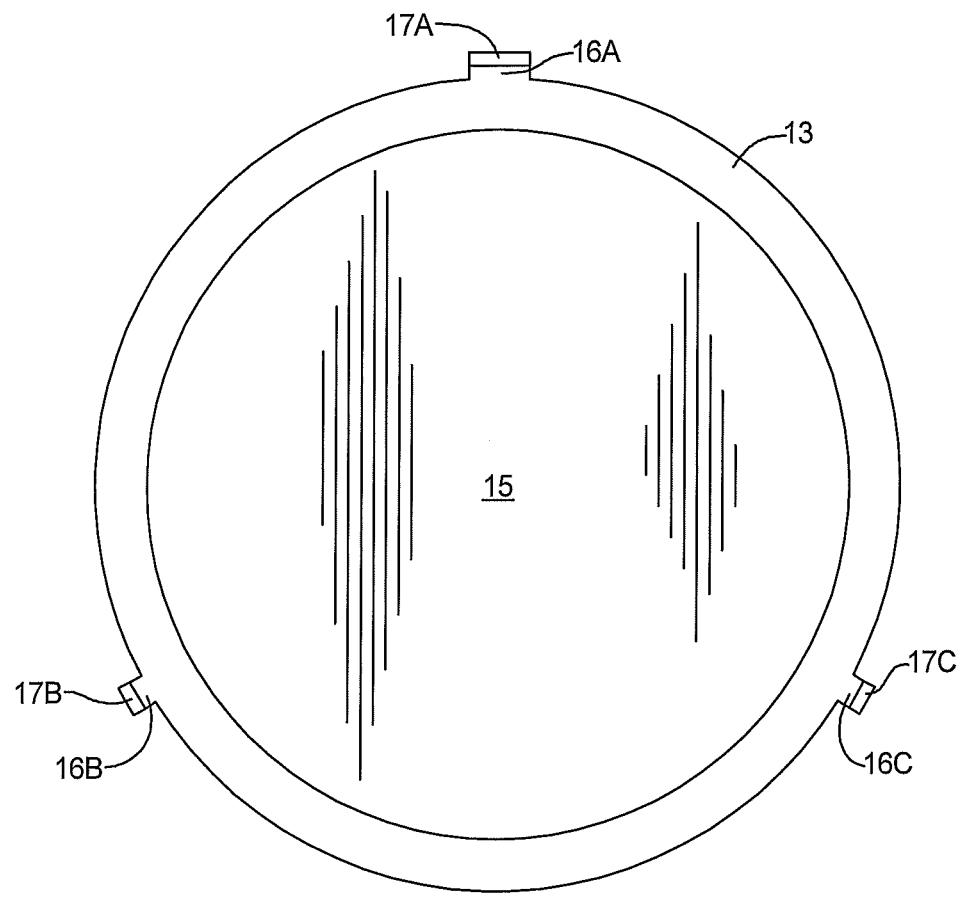
FIG. 6 is an end planar view of the check valve flange of the exemplary check valve with indexing.

Now referring to FIG. 6 of the drawings a planar view of the check valve 15 is shown. Primary index tab 16A extends outwardly from the check valve flange 13 and is then deformed in an approximate 90 degree angle to form the primary index finger 17A. The primary index tab 16A is greater in width than the secondary index tabs 16B and 16C and consequently the void area 41A formed in the outer annular ridge 23 formed in the first flange 20 is wider to accommodate the increased width of the primary index tab 16A.

At a position approximately 120 degrees from the primary index tab 16A is a secondary index tab 16B which is narrower than the primary index tab 16A. In a substantially identical manner, the secondary index finger 17B is formed by bending the secondary index tab 16B to form a 90 degree angle to the secondary index tab 16B. At a distance of 120 degrees following the primary index tab 16A or the secondary index tab 16B is another secondary index tab 16C which in a substantially identical fashion to the secondary index finger 17B the secondary index finger 17C is formed by bending the secondary index tab 16C to a 90 degree angle. Alternative methods of forming the primary and secondary index fingers are possible such as by attaching separate pieces of the index fingers to their respective index tabs or by welding additional material to the index tabs to form the index fingers. Many other methods of producing the index tabs and index fingers are possible, as are known in the art. Also, the spacing between the index tabs can be varied from the 120 degrees shown in this disclosure and will still function as contemplated.

Figure 7:
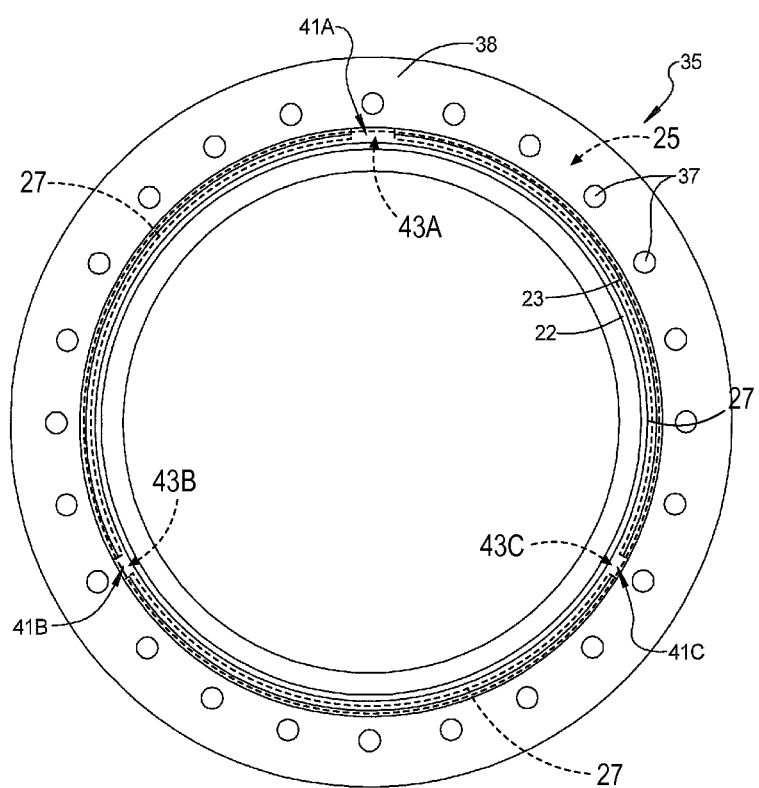
FIG. 7 is an end planar view of the check valve flange joined to a duct flange of the exemplary check valve with indexing.

Now referring to FIG. 7 of the drawings, a planar view of the mounting flange assembly 35 is shown. In this view the void areas 41A, 41B, 41C formed in the outer annular ridge 23 in the first flange 20 are more clearly shown. The inner annular ridge 22 is shown as a continuous ring segment. Note that the width of the void area 41A is wider to accommodate the increased width of the primary index tab 16A. These void areas 41A, 41B and 41C provide clearance for the index tabs 16A, 16B and 16C to occupy when the first flange 20 is assembled to the check valve 15. Segments of the outer annular ridge 23 have been removed to form the void areas 41A, 41B, 41C whereas the inner annular ridge 22 is continuous. If it is desired to also index or clock the second duct flange 25, then the annular ridge 27 must be used and void areas or slots 41A, 41B, 41C must be formed in the first duct flange 20 and void areas 43A, 43B, 43C (as shown in broken lines) must be formed in the second duct flange 25 to accommodate the index tabs 16A, 16B and 16C.

Figure 8:
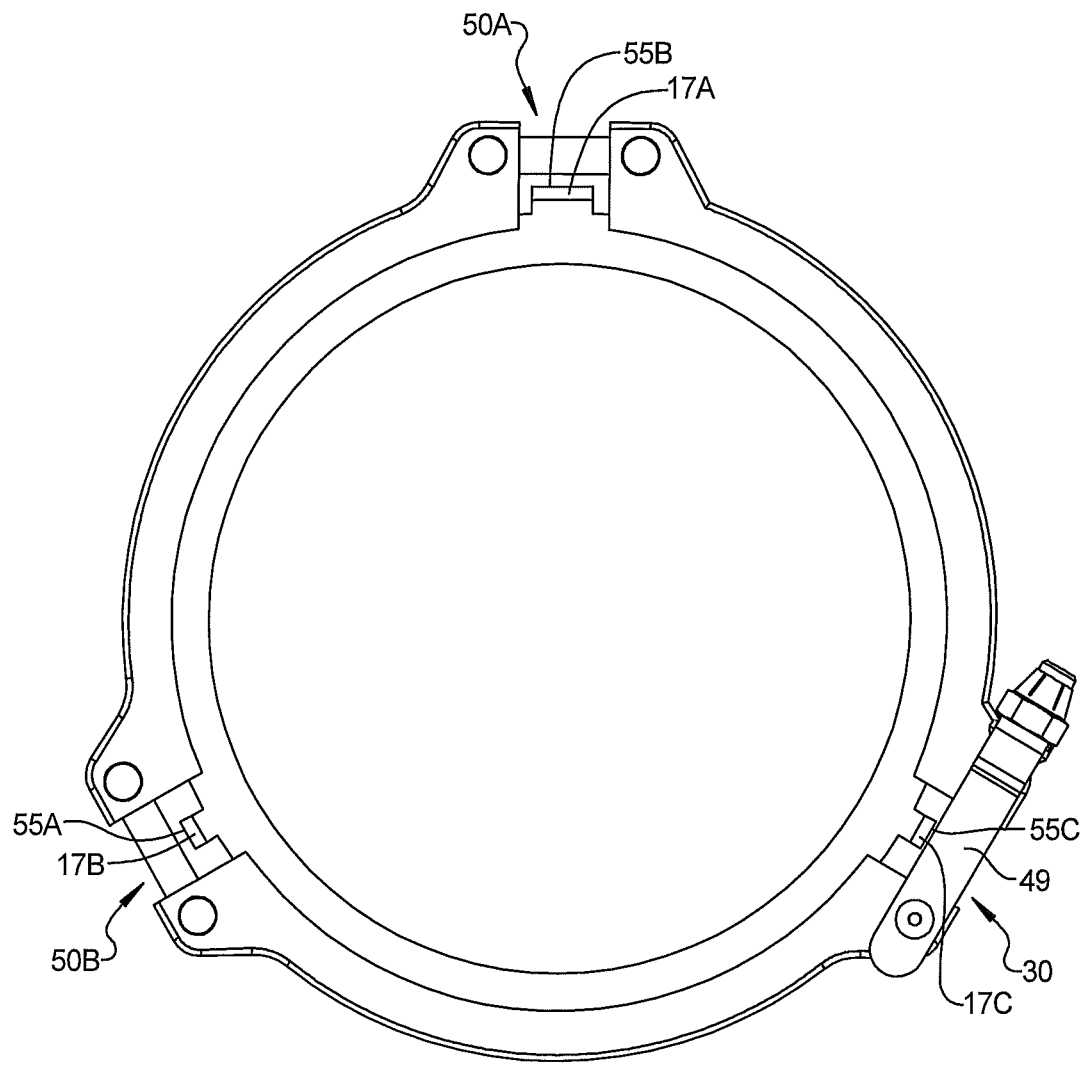
FIG. 8 is a cross-section view of the exemplary check valve with indexing using a clamping band to hold the assembly together.

Now referring to FIG. 8 of the drawings, a planar view of the exemplary check valve assembly 10 is shown. In this view, it is more clearly illustrated how the primary index finger 17A and the secondary index fingers 17B and 17C work together to ensure that the proper model of band clamp 30 is used with the check valve assembly 10 to clamp the first flange 20 to the second duct flange 25. A light duty band clamp (not shown) only uses one hinge joint and one fastener whereas, the heavy duty band clamp uses one fastener 49 and two hinge joints 50A, 50B as is shown in FIG. 8. The gaps 55A 55B and 55C formed in the fastener 49 and the hinge joints 50A, 50B allow for the index fingers 17A, 17B and 17C to extend into the gaps 55A, 55B, 55C if the proper band clamp 30 is used and is rotationally positioned in the proper orientation to the check valve 15.

In this view it is clearly shown how the primary index finger 17A extends into a gap 55B formed in the band clamp 30 although the primary index finger 17A could occupy any of the gaps 55A, 55B, 55C. In a similar fashion, the secondary index fingers 17B and 17C extend into the two other gaps 55A, 55C formed by the band clamp 30. Gaps 55A, 55B and 55C formed in the fastener 49 and the hinge joints 50A and 50B allow the primary index finger 17A and the secondary index fingers 17B, 17C to pass into the fastener 49 and the hinge joints 50A and 50B equally as well one as the other. Thus, this particular configuration only allows for the use of a band clamp 30 having a fastener 49 and two hinge joints 50A, 50B. This prevents the inadvertent use of a different model of band clamp 30 not having three gaps 55A-C or not orientated with the same spacing.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

I claim:

1. An aircraft check valve assembly comprising:
a first duct flange having an outer annular ridge interrupted in a circumferential direction by at least one void area;
a second duct flange;
a check valve having a check valve flange extending annularly therefrom including at least one index tab, wherein the index tab occupies the void area formed in the outer annular ridge;
wherein the outer annular ridge is interrupted in the circumferential direction by a plurality of circumferentially spaced void areas, the outer annular ridge extending continuously between the respective void areas.

2. The assembly of claim 1, wherein the outer annular ridge extends uninterrupted along a radially outer edge of the first duct flange and terminates at the void area.

3. The assembly of claim 1, wherein the plurality of void areas includes at least one primary void area and at least one secondary void area, the at least one primary void area being wider in the circumferential direction than the at least one secondary void area.

4. The assembly of claim 1, wherein the check valve flange includes a plurality of index tabs corresponding to the plurality of spaced void areas, wherein the respective index tabs occupy the associated void areas to index the first duct flange to the check valve.

5. The assembly of claim 1, further comprising an index finger extending from the index tab at an angle and engaging a gap formed by a band clamp, wherein the band clamp provides a clamping load on the first duct flange and the check valve flange.

6. The assembly of claim 1, wherein the first duct flange includes a radially inner annular ridge concentrically arranged with the outer annular ridge, the inner annular ridge extending uninterrupted in the circumferential direction around the first duct flange and configured to retain a seal in position on the first duct flange.

7. An aircraft check valve assembly comprising:
a first duct flange opposed by a second duct flange having a check valve;
an annular check valve flange extending from the check valve, wherein the check valve flange is captured between the first duct flange and the second duct flange and held together by a band clamp contacting the first duct flange and the second duct flange, the band clamp including at least one fastener spaced away from at least one hinge joint, wherein the at least one fastener and the at least one hinge joint respectively delimit a gap;
at least one index tab extending from the check valve flange and connected to an associated index finger, wherein the check valve is rotatable relative to the first duct flange and the index finger of the at least one index tab engages at least one of the gap formed in the at least one hinge joint and the gap formed in the at least one fastener thereby rotationally indexing the band clamp to the check valve.

8. The aircraft check valve of claim 7, wherein the first duct flange includes a continuous outer annular ridge interrupted in a circumferential direction by at least one void area, wherein the index tab engages the void area to index the check valve to the first duct flange.

9. The aircraft check valve of claim 7, wherein the second duct flange includes a continuous annular ridge interrupted by at least one void area defined between terminating ends of the annular ridge.

10. A check valve for installation in an aircraft duct system comprising:
a check valve flange extending radially from the check valve;
at least one index tab formed in the check valve flange;
a first duct flange configured to join to the aircraft duct system, the first duct flange having an outer annular ridge formed thereon and having at least one void area defined by a removed segment interrupting the outer annular ridge in a circumferential direction for receiving the index tab, whereby the first duct flange is indexed to the check valve;
further comprising a band clamp for applying a clamping load to the first duct flange against the check valve flange;
wherein a plurality of index tabs are formed in the check valve flange, the respective index tabs including an associated index finger attached thereto configured to engage one of a plurality of gaps formed by the band clamp, wherein a number of index finger has a corresponding number of gaps formed by the band clamp for error proofing the band clamp to the check valve.

11. The check valve of claim 10, further comprising an index finger attached to the index tab, the index finger engaging a gap formed by the band clamp, wherein the check valve is indexed to the band clamp.

12. The check valve of claim 11, wherein the index finger is orientated relative to an operational direction of the check valve, wherein the operating direction of the check valve can be visually confirmed to error proof the check valve assembly.

* * * * *